Figure 1:

(No Model.)

J. JACOBSON.
METHOD OF MAKING WATCH DIALS.

No. 444,894. Patented Jan. 20, 1891.

Outline of die

Witnesses
Jas. J. Maloney
M. E. Hall

Inventor,
John Jacobson
by Jos. P. Livermore
Att'y.

THE NORRIS PETERS CO., PHOTO-LITHO., WASHINGTON, D. C.

UNITED STATES PATENT OFFICE.

JOHN JACOBSON, OF BOSTON, MASSACHUSETTS.

METHOD OF MAKING WATCH-DIALS.

SPECIFICATION forming part of Letters Patent No. 444,894, dated January 20, 1891.

Application filed March 20, 1888. Serial No. 267,913. (No model.)

*To all whom it may concern:*

Be it known that I, JOHN JACOBSON, of Boston, county of Suffolk, State of Massachusetts, have invented an Improvement in Methods of Makings Watch-Dials, of which the following description, in connection with the accompanying drawings, is a specification, like letters on the drawings representing like parts.

The object of my invention is to simplify the construction of a watch-dial, and thereby produce an improved dial at less cost than those now made.

In dials as now made in which the seconds-circle is sunk below the face of the main portion of the dial the said circle is a separate independent dial attached to the main dial, which is made in the form of a complete disk having a uniform surface, and then has a portion cut from it to receive the seconds-circle.

My invention consists, mainly, in producing the depression in the enamel by molding or stamping the same in dies, such molding being usually performed upon the enamel material in its plastic condition just before it is heated, and in some cases being also performed upon the enamel just as it reaches its most heated condition in the operation of firing, when the material is somewhat plastic and capable of receiving an impression which will be clear and sharp in the material when it is cooled. In some cases the depression may be made wholly by stamping the heated enamel without the preliminary stamping of the same when applied in its plastic condition to the metal base of the dial, the essential feature of the invention being the shaping of the enamel by stamping or impressing the same by dies, and, while such molding or shaping is herein shown and described as being for the purpose of depressing the seconds-circle, it is obvious that the same method is applicable for producing other shapes in the surface of the enamel of the dial. In order to obtain the best results, the copper or metal base for the enamel is provided with a recess in the part where the seconds-circle is to be made, and then receives its covering of enamel, which may be spread on the metal base with its upper surface level or even, so that before it is molded the enamel will be thicker over the seconds-circle than over the remainder of the dial, and can consequently be depressed or stamped to make the recessed seconds-circle without making the enamel too thin on the seconds-circle, as is the case when an attempt is made to sink the seconds-circle by grinding the baked enamel of a dial having the copper base and consequently the coating of enamel of uniform thickness.

Figure 2:
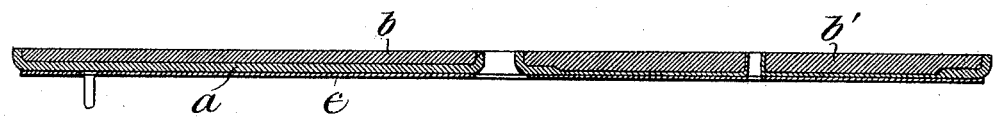
Figure 3:
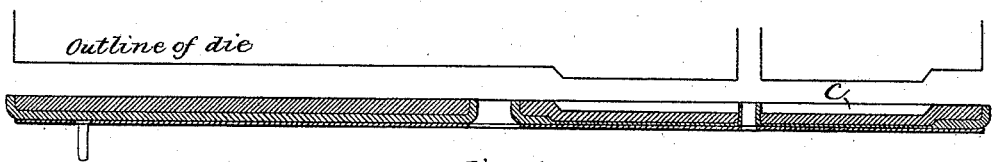
Figure 4:
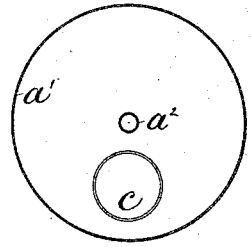

Figure 1 is an enlarged section of the metal base of proper construction for making a watch-dial in accordance with this invention; Fig. 2, a similar section showing the metal base and the coatings of plastic enamel upon both sides of the same; Fig. 3, a similar section of the finished dial with its enamel molded or stamped to shape, and Fig. 4 a face view of the finished dial.

In making a dial in accordance with the process or method forming the subject of this invention the metal base $a$, Fig. 1, having the usual flange or rim $a'$ about its periphery and a central nipple $a^2$, is provided with a depression $a^3$ in the portion that is to be occupied by the seconds-circle, the said depressed portion preferably also having a nipple $a^4$, that rises as high as the flange $a'$, as shown in Fig. 1, so that the whole plate forms a shallow dish or pan, which receives the enamel $b$ (see Fig. 2) and retains it while in its plastic or semi-fluid condition.

When the enamel $b$ is laid on the upper surface of the metal base $a$, as shown in Fig. 2, the portion $b'$, that enters the depression $a^3$ in the metal base, is of greater thickness than that over the remainder of the dial, which is of proper thickness to give a sufficient opaque body to the enamel and prevent the metal base from showing through. The depressed seconds-circle $c$ (see Fig. 3) is then made by stamping and depressing the portion of the enamel at $b'$ by a die, the outline of which is shown in Fig. 3, and, owing to the thickness of the said enamel in this part of the dial, a sufficient depression can be made to sink the seconds-circle as deep as may be required without making the enamel too thin in the said seconds-circle. The dial may then be heated or baked in order to convert the plastic enamel into the hard finished material, and it may in some cases be desirable to repeat the stamping or molding operation upon the heated enamel while still remaining soft or yielding, owing to its great heat.

In some cases the molding of the material may be wholly effected while in its heated condition, and it may in some cases be of advantage to finish the surface after it has been molded, as described, by grinding, such operation being especially desirable when the enamel has been stamped or molded only in its cold condition.

The depression in the copper disk or metal base may be made by cutting out or milling away a portion of the metal, thus leaving the thin or reduced portion of about the same density as the remainder of the dial-base.

The back of the dial may be provided with the usual thin coating e of enamel.

I claim—

1. That improvement in the art or method of making watch-dials which consists in providing the metal base of the dial with a covering of enamel of uneven thickness but level surface, molding the said enamel by stamping and depressing the surface of the thicker portion, and baking the said enamel, substantially as described.

2. That improvement in the art or method of making watch-dials which consists in providing the metallic base of the dial with a covering of plastic enamel, baking the said enamel, and stamping or pressing the same to the desired shape while heated, substantially as described.

In testimony whereof I have signed my name to this specification in the presence of two subscribing witnesses.

JOHN JACOBSON.

Witnesses:
   JOS. P. LIVERMORE,
   JAS. J. MALONEY.